April 21, 1942.  G. G. SOMERVILLE  2,280,551
WELDING APPARATUS
Filed Aug. 9, 1941   2 Sheets-Sheet 1
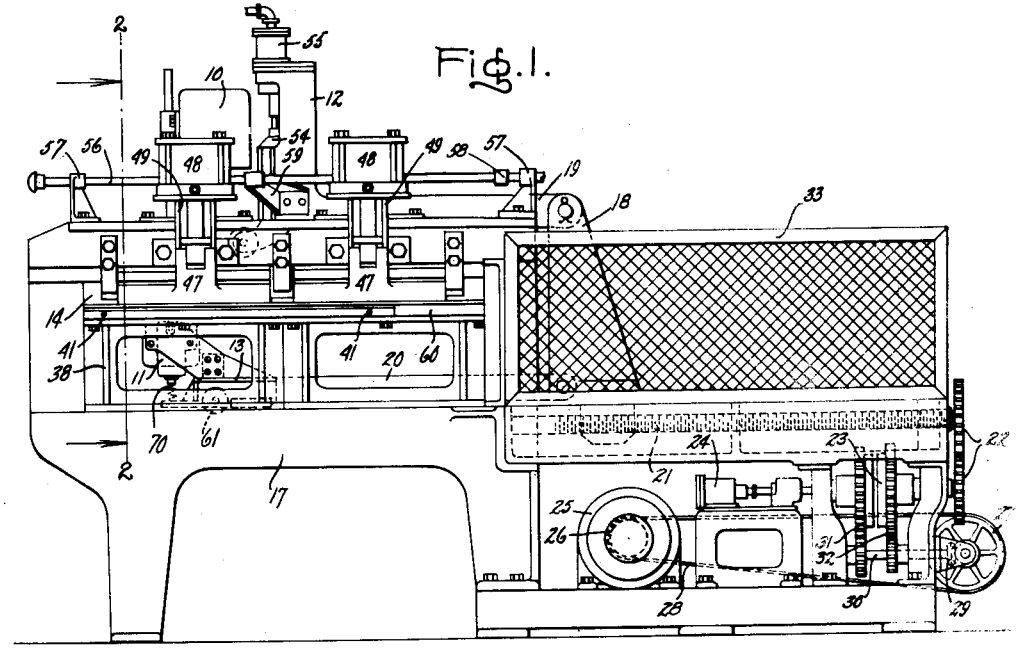
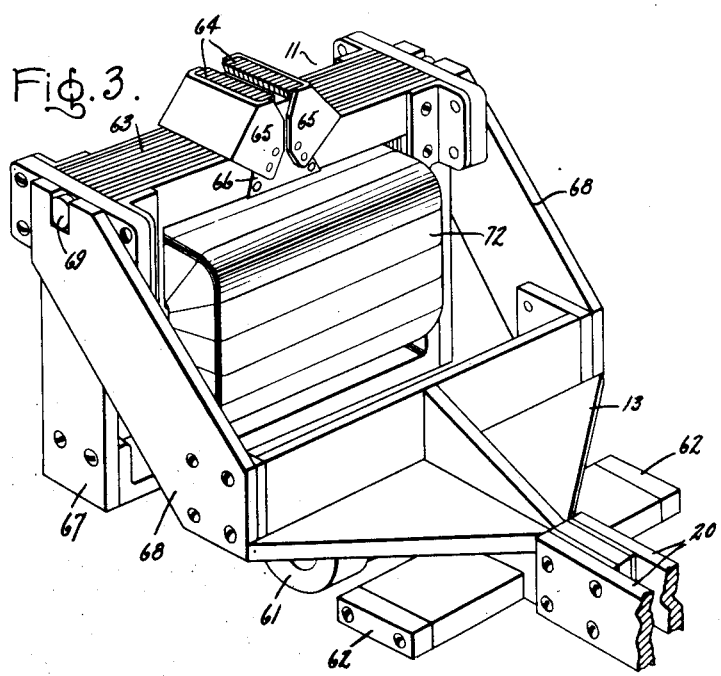
Inventor:
Gareth G. Somerville,
by Harry E. Dunham
His Attorney.

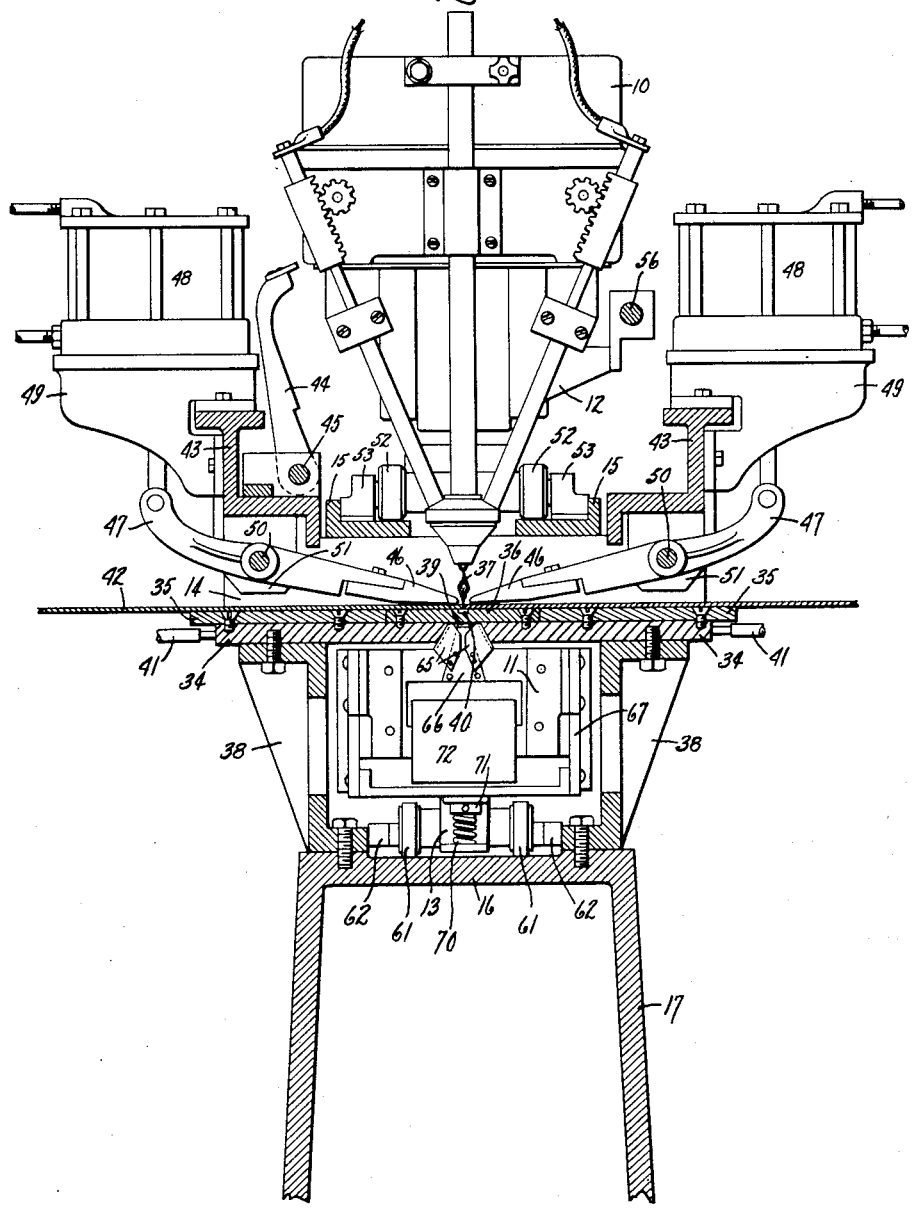

Patented Apr. 21, 1942

2,280,551

UNITED STATES PATENT OFFICE 2,280,551

WELDING APPARATUS

Gareth G. Somerville, Pittsfield, Mass., assignor to General Electric Company, a corporation of New York Application August 9, 1941, Serial No. 406,106

8 Claims. (Cl. 219—8)

My invention relates to welding apparatus particularly suited for welding silicon steel sheets into long strips from which punchings for magnetic core circuits are stamped.

The butt welding of silicon steel has always been a difficult problem. This steel being high in silicon content and coated with a heavy layer of scale does not lend itself readily to resistance welding and heretofore every fusion welding process that has been tried has met with almost complete failure because of the distortion resulting from the excessive heat employed.

In making the fusion weld, the heat must be kept from running back into the sheets and producing unpermissible distortion at the seam. This has been accomplished by using alignment clamps which may be spaced $\frac{1}{8}''$ to $\frac{1}{16}''$ from one another to engage the sheets closely adjacent their edges and act at the same time as heat stops. With such clamps, however, it is possible to fuse the sheet edges with an oxy-acetylene flame only at low speeds for more heat is absorbed by the clamps than is needed to fuse the metal at the seam.

The atomic hydrogen arc with its extremely high temperature and other qualifications is an ideal source of heat for this purpose but to concentrate the atomic flame on a seam and hold the heat band to less than $\frac{1}{16}''$ requires that the atomic arc travel down between the clamps and impinge on the edges of the sheets at the seam between them.

In application Serial No. 345,226 for United States Letters Patent on the joint invention of James T. Catlett and myself filed July 12, 1940 and assigned to the assignee of this invention, there has been disclosed and claimed a magnetic control for the atomic hydrogen arc which not only acts to pull the arc down to the seam, but also acts on the middle portion of the arc to move it in a lateral direction until it is positioned immediately over the seam. With this control it is possible to hold the heat band of the atomic hydrogen flame to less than $\frac{1}{16}''$ when the work clamps come within $\frac{1}{8}''$ to $\frac{1}{16}''$ of each other.

It is an object of my invention to apply the magnetic control of the above identified Letters Patent in a machine of improved construction.

Further objects of my invention will become apparent from a consideration of the following description of the embodiment thereof illustrated in the accompanying drawings, Fig. 1 of which is a side view of the machine with certain parts not essential to my invention omitted therefrom for the purpose of simplification, Fig. 2 of which is a sectional view of the machine taken along line 2—2 of Fig. 1, and Fig. 3 of which is a perspective view of the magnetic means employed for controlling the atomic hydrogen arc.

In accordance with my invention sheets of silicon steel are located and clamped on a non-magnetic support with their edges abutting one another to form a seam extending along this support. This clamping means acts not only to hold the sheet edges in assembled relationship but also to conduct sufficient heat from them to prevent their distortion during welding. An atomic hydrogen torch is provided on one side of the support for welding the sheets and an electromagnet having pole pieces engaging said support is positioned on its other side for controlling the atomic hydrogen arc. The atomic hydrogen torch and the electromagnet are supported on separate carriages which are located relatively to one another so that the magnetic field of the electromagnet passes through the support to interlink the arc loop established between the electrodes of the torch and thereby control the alignment and spacing of the middle portion of the arc loop with the seam between the sheets of silicon steel which are located on the support. Means are also provided in this machine for transversing these carriages in unison along the seam between the silicon sheets during the formation of the weld which joins these sheets. The support for the silicon sheets is preferably provided on one side with a groove which assists in forming the weld by limiting heat conductivity at the seam and on its other side with a parallel oppositely disposed groove which not only positions the pole pieces of the electromagnet nearer the seam where it is more effective, but also acts as a guide for directing the pole pieces of the magnet along the seam during welding.

As shown in the drawings an atomic hydrogen torch 10 and an electromagnet 11 are respectively mounted on carriages 12 and 13 which are located on opposite sides of a support or table 14 on which the work parts are placed for welding. These work parts are the sheets of silicon steel which are to be joined by welding. Carriages 12 and 13 are supported on guides or tracks 15 and 16 (Fig. 2) located in the front portion of the frame 17 of the machine. These carriages are moved along these tracks by an upwardly extending member 18 located in the rear portion of the machine frame and connected by links 19 and 20 with these carriages. Member 18 makes a sliding engagement with its support in the rear portion of the machine frame and is moved along this support by a lead screw 21 which engages a threaded portion of member 18.

Lead screw 21 extends along the sliding support for member 18. Its ends are mounted in bearings at each end of this support. The rear end of the lead screw is connected through gears 22 to a clutch 23 which is actuated by a fluid operated device 24 comprising a piston and cylinder. Opposite rotation is imparted to two elements of clutch 23 by a motor 25. This motor is provided with a pulley 26 which drives a pulley 27 through the agency of a belt 28 which passes over and interconnects these pulleys. The rotational speed of pulley 27 may be controlled by controlling the speed of motor 25 or by the use of an adjustable transmission located between motor 25 and pulley 27. The shaft for pulley 27 is connected through bevel gears 29 with a shaft 30 which is gear connected to clutch 23. Rotation in one direction is imparted to one clutch element through a gear train 31 and rotation in the opposite direction is imparted to the other clutch element through a gear train 32. It is thus apparent that by actuating clutch 23 through the agency of fluid operated device 24, either of the reversely rotating elements of clutch 23 may be connected through gears 22 to rotate lead screw 21 in one direction or the other to propel member 18 in one direction or the other along its support. The speed of travel of member 18 may be adjusted by adjusting the speed of motor 25 or by adjusting the speed of a transmission such as referred to above. Guard screens 33 are provided for enclosing member 18 and that portion of the machine along which this member moves.

As shown in Fig. 2, table 14 is formed of bronze plates 34, steel plates 35, and a copper plate 36. Plate 36 extends lengthwise of table 14 and in conjunction with the inner side portions of plates 34 forms a nonmagnetic section through which the flux of electromagnet 11 is directed to interlink the arc loop 37 of atomic hydrogen torch 10. Plates 34 are attached to brackets 38 which extend lengthwise of the front portion of the machine frame to which they in turn are attached. It will be noted that the inner sides of plates 34 are beveled and spaced from one another to form a groove 39 which is immediately opposite and parallel with a groove 40 which extends lengthwise of plate 36. This copper plate and the steel plates 35 located on each side thereof are each attached by screws or similar fastening means to the bronze plates 34. It is of course apparent that table 14 may be made of a single plate of nonmagnetic material but the construction used gives to the outer sides of the plate the wear resisting qualities of steel and makes it possible to renew these plates as well as the copper plate by replacement when, due to wear, their surfaces no longer provide an adequate support for the sheets of silicon steel located thereon.

Those portions of the table subjected to the heat of the atomic hydrogen flame are cooled by the circulation of a cooling medium such as water through passageways located in the immediate vicinity of grooves 39 and 40. These passageways are conveniently formed of copper tubing located in grooves cut into the table structure. The terminal portion of two such tubes and the hoses connected thereto are indicated at 41 in the drawings.

Prior to welding, the sheets to be welded 42 are properly located and clamped to table 14 by mechanisms which are supported on bars 43 extending lengthwise of the front portion of the machine frame. The ends of these bars as well as the ends of track members 15 are attached to and supported by upstanding portions of the machine frame.

The locating mechanism comprises a plurality of fingers 44 (Fig. 2) which are attached to and rotated by a shaft 45 from the position illustrated to a position in which the free ends of these fingers engage the top of table 14. The right-hand sheet 42 of silicon steel is then placed on table 14 and inserted in the machine until its edge portion engages and is located relative to the table by these fingers 44. This sheet is then clamped in this position and the locating fingers thrown to the position illustrated in Fig. 2, whereupon the other sheet of silicon steel 42 is inserted in the machine from its other side until its edge engages the edge of the sheet already located therein. This second sheet is then clamped in position on the table. Shaft 45 for fingers 44 is rotatably mounted in blocks distributed lengthwise of one of the bars 43 above referred to. It is of course apparent that prior to this operation the atomic hydrogen welding torch has been moved lengthwise of the machine to a position where it does not interfere with the movement of fingers 44. When these fingers are thrown to the position illustrated in Fig. 2 they are clear of the path of movement of the welding torch.

The clamping mechanism comprises four jaw members 46 each of which is moved into and out of engagement with the sheets of silicon steel by levers 47 actuated by fluid operated devices 48. These fluid operated devices may be as illustrated, a piston and cylinder arrangement in which the piston is moved relatively to the cylinder by the admission or exhaustion of compressed air from opposite ends of the cylinder. These devices are supported on brackets 49 which are attached to bars 43. Levers 47 are also supported by these bars, being mounted thereon for rotation about shafts 50 which are located in lugs 51 attached to the under sides of these bars.

As previously stated the atomic hydrogen torch 10 is supported on a carriage 12 which is moved along guides or track members 15. This carriage is provided with an axle on which there are two wheels 52 which travel along track members 15. The axle is also provided at each end with guides 53 which engage track members 15 and direct the travel of the carriage 12 therealong.

The atomic hydrogen torch is preferably an automatic device having a construction such as that described and claimed in United States Letters Patent No. 1,946,305 James T. Catlett granted February 6, 1934 and assigned to the assignee of this invention. The electrodes of this torch are positioned relative to one another and the seam between the silicon steel sheets 42 so that the middle portion of the arc loop established therebetween is adjacent to and directed along the seam. This may be accomplished by arranging the electrodes of the torch on opposite sides of the seam with the arcing terminals of the electrodes offset from one another in the direction of the seam in order to obtain an S shaped arc such as disclosed and claimed in the above identified Letters Patent No. 1,946,305. This may also be accomplished by arranging the electrodes of the torch in line with the seam without offsetting their arcing terminals. This latter arrangement may often prove to be preferable and may be accomplished by turning the welding head ninety degrees from the position illustrated and by adjusting the electrodes so that their arcing terminals are not offset from one another crosswise of the seam.

The atomic hydrogen torch as shown in Fig. 1 is mounted on a slide 54 supported in carriage 12 for movement toward and away from table 14. This slide is actuated by a fluid operated device 55 mounted on top of carriage 12. This fluid operated device 55 may be a piston and cylinder arrangement in which the piston is moved relative to the cylinder by the admission of an operating fluid such as air to the cylinder. This mounting of the atomic hydrogen torch is provided so that its arcing terminals may be moved from a welding position closely adjacent the work table to a non-welding position removed a certain distance therefrom.

The actuation of fluid operated device 24 to control clutch 23 is determined by the movement of a rod 56 which is lengthwise movable in bearing brackets 57 attached to one of the bars 43. This rod is connected with a valve mechanism not shown which controls the admission and exhaust of fluid from fluid operated device 24. This rod may be moved by hand or automatically through the coaction of collars 58 attached to rod 56 and a bracket 59 attached to and movable with carriage 12. Bracket 59 has a portion which rides along rod 56 to engage collars 58 at predetermined points in its travel determined by the adjustment of collars 58 on rod 56. Thus by manually operating rod 56, travel of the welding torch in one direction or the other along the seam to be welded may be initiated and after a predetermined travel the welding head may be brought to rest by the action of bracket 59 on collars 58 located on rod 56.

In the machine illustrated the arrangement of parts is such that the sheets to be welded are inserted and removed from the machine when the welding torch has been located near the middle of the machine at one end of its path of travel. In order to protect the machine from the action of the atomic hydrogen flame after it has passed beyond the silicon sheets, a cooling plate 60 may be located at the inner end of table 14. Preferably this plate is artificially cooled. It may be provided with cooling passageways in that portion which is subjected to the heat of the welding torch. Water may be circulated through these passageways which may be connected in circuit with the cooling passageways in table 14. The under side of this cooling plate is also provided with a continuation of groove 39 of table 14.

As previously stated electromagnet 11 is supported on a carriage 13. As shown in Fig. 2, this carriage is provided with an axle for wheels 61 which travel along the frame 17 of the machine. Guides 62 forming part of the carriage frame engage inner portions of brackets 38 and guide carriage 13 in its travel along the machine frame.

As shown in Fig. 3 the electromagnet comprises a laminated core structure 63 provided with pole pieces 64 of opposite polarity. These pole pieces are provided with Monel metal shoes 65 which slideably engage the beveled ends of bronze plates 34 forming part of the work table 14. A nonmagnetic insert 66 is located between these pole pieces. This insert may be made of resin-bonded laminated material such as Herkolite.

The core structure 63 of the electromagnet is supported by a nonmagnetic frame 67 which is located in arms 68 forming part of carriage 13. Relative movement between frame 67 and arms 68 is provided by slot and pin connections 69 located therebetween. A spring 70, best shown in Fig. 2 is inserted between carriage 13 and frame 67 for yieldingly biasing electromagnet 11 toward table 14 and thereby holding pole pieces 64 of the electromagnet in the slot provided therefor in table 14. The tension of spring 70 may be adjusted by a nut 71 which is threaded on a stud about which the spring is located. The electromagnet is energized by a winding 72.

In view of the above description, the operation of the machine is believed to be perfectly obvious. Briefly it is as follows:

One of the sheets to be welded, 42, is inserted into the right side (Fig. 2) of the machine along the top surface of table 14 until its edge engages locating fingers 44 which have been lowered onto the table. This sheet is then clamped to the table by actuation of the fluid operated devices 48 on that side of the machine. The locating fingers are then thrown up out of the way to the position illustrated in Fig. 2 and the other sheet to be welded is then inserted into the other side of the machine until its edge engages the edge of the first sheet. The fluid operated devices 48 on that side of the machine are then actuated to clamp this second sheet in position on the work table. The locating fingers 44 are properly positioned in the machine to locate the seam between the two sheets immediately over groove 40 in the supporting surface of table and over groove 39 in the opposite surface thereof.

The welding torch 10 and electromagnet 11 are positioned in the machine by their travel carriages so as to be immediately opposite one another on opposite sides of table 14. Consequently the magnetic flux of electromagnet 11 passes through the nonmagnetic section of table 14 and through the edge portions of sheets 42 across the seam between these sheets to interlink the arc 37 of the welding torch. This flux arches across the seam gap and is preferably directed so as to reenforce the self-generated flux inside the arc loop. The arc being an electrical conductor is acted on by this flux in such a manner that its central portion is attracted to the seam and aligned therewith. This magnetic flux not only acts to pull the arc down to the seam but also acts on the central portion of the arc to move it in a lateral direction until it is positioned immediately over the seam. This action consequently takes care of any irregularities in the path of travel of the welding torch along the seam. It is also to be noted that the pole pieces of the electromagnet are accurately positioned relative to the table by their engagement with the surface of groove 39 in table 14 and that consequently the electromagnet is at all times effective for directing the flux across the abutting edges of the sheets to be welded. Irregularities in the movement of travel carriage 13 consequently have no effect on the desired movement of electromagnet 11 along the seam.

The operator then moves rod 56 to initiate the travel of welding torch 10 and electromagnet 11 along the seam and after the seam has been welded the engagement of bracket 59 on carriage 12 with one of the collars 58 on rod 56 again actuates the rod to stop the travel of the welding torch and electromagnet along the seam. Preferably travel is arrested when the welding torch has passed beyond table 14 to a position over cooling plate 60. The welding torch may then be elevated to its non-welding position by the actuation of fluid operated device 55. By releasing the welding clamps, the welded assembly may then be removed from the machine.

Welding may proceed in either direction. Since it is generally desirable to anneal the weld, the welding operation may start from a position adjacent cooling plate 60 and progress toward the front of the machine until the weld is completed, whereupon the direction of travel of the welding torch and electromagnet may be reversed and its rate of travel increased so that the heat of the atomic flame anneals the weld as the torch and electromagnet return to their initial position opposite the cooling plate.

The water cooled middle portion of the table and the uniform close spacing of the clamping jaws 46 prevent warping of the plates during the welding operation. This warping action is also greatly minimized by the accurate control of the arc of the atomic hydrogen torch through the agency of the magnet field of electromagnet 11. The groove 40 in the top surface of the table immediately under the seam between the parts to be welded prevents a too rapid conduction of heat from the seam and thus facilitates the formation of a weld at the abutting edges of the parts to be welded.

Although the machine above described and claimed is particularly suited for joining sheets of silicon steel into long strips from which laminations for magnetic core circuits are stamped, it is of course apparent that it may be used for other purposes. For example, it may also be used for joining sheets into springs which are to be coiled or passed through an annealing furnace. It may also be used whenever it is desired to weld thin sheets of material at high rates of speed. The material need not of necesity be a magnetic material since sheets of aluminum, copper, and the like, may also be welded.

It is also apparent that my invention is not limited to a machine embodying an atomic hydrogen torch as the heating instrumentality. Any arc or gas-arc torch may be used, since the controlling effect of the electromagnet is effective for controlling any arc which is established between electrodes whose arcing terminals are positioned close enough to the work parts to permit the magnetic flux which passes through the work parts and across the seam to act thereon and control it.

The arc and exciting winding of the electromagnet may be energized from any suitable source of alternating or direct current supply. It is also possible to control the phase relationship between the alternating current supplied to the electrodes and to the exciting winding of the electromagnet in order to control the heating effect of the arc established between the electrodes. The magnetic means 11 may be a permanent magnet, since a unidirectional flux is effective when employing a direct current arc and may in certain circumstances be used with an alternating current arc.

Many other variations and modifications of my invention will occur to those skilled in the art in view of the above disclosures, and I consequently intend in the appended claims to cover all such modifications and variations.

What I claim as new and desire to secure by Letters Patent of the United States, is:

1. Welding apparatus comprising a nonmagnetic support, means for clamping work parts on said support with their adjacent edges forming a seam which extends along said support, means on one side of said support for establishing an arc between electrodes whose arcing terminals are positioned relatively to one another and said seam between said work parts so that the middle portion of said arc loop is adjacent to and directed along said seam, means on the opposite side of said support for generating a magnetic field which passes through said support and the adjacent edges of said work parts on said support across said seam between said work parts at the gap between them and the arcing terminals of said electrodes, and means for transversing said last two mentioned means and said support relatively to one another along said seam between said work parts with said last two mentioned means positioned opposite one another so that said magnetic field passes through said arc loop and controls the alignment and spacing of its middle portion with said seam.

2. Welding apparatus comprising means including a nonmagnetic support and uniformly and closely spaced nonmagnetic jaws for clamping and conducting heat from the abutting seam edges of work parts located on said support, means adjacent said support and said jaws for supplying gas about and across an arc loop established between the arcing terminals of a plurality of electrodes positioned relative to one another and said seam so that the middle portion of said arc loop is directed along said seam, means including the pole pieces of a magnet for directing a magnetic field through said support and the adjacent edges of said work parts cross said seam at the gap between said seam and the arcing terminals of said electrodes, means for yieldingly holding said pole pieces of said magnet against said support, and means for transversing said support, said electrodes and said magnet relative to one another along said seam with the arcing terminals of said electrodes and said pole pieces of said magnet positioned opposite one another so that the magnetic field between said pole pieces passes through said arc loop and controls its alignment and spacing with said seam.

3. Welding apparatus comprising a nonmagnetic support, means for locating work parts on one side of said support with their edges abutting one another to form a seam extending along said support, means including said support and uniformly and closely spaced nonmagnetic jaws for clamping and conducting heat from the abutting seam edges of said work parts located on said support, a plurality of electrodes positioned relatively to one another and said seam between said work parts so that the middle portion of the arc loop established between said electrodes is adjacent to and directed along said seam, means including a magnet having pole pieces of opposite polarity located on the other side of said support for generating a magnetic field which passes through said support and the edges of said sheets across said seam, means for yieldingly holding said pole pieces of said magnet against said support, and means for transversing said electrodes, said magnet, and said support relatively to one another along said support with the arcing terminals of said electrodes and the pole pieces of said magnet located opposite one another so that the magnetic field between said pole pieces passes through said arc loop and controls its alignment and spacing with said seam.

4. Welding apparatus comprising a nonmagnetic support having a groove in one side thereof, means for locating and clamping work parts to the other side of said support with their adjacent edges abutting one another to form a seam which is centered over said groove, a plurality of electrodes positioned relatively to one another and said seam between said work parts so that the middle portion of an arc loop established between said electrodes is adjacent to and directed along said seam, means including a magnet having pole pieces of opposite polarity located in said groove of said support for generating a magnetic field which passes through said support and the edges of said sheets across said seam, means for yieldingly holding said pole pieces of said magnet in said groove against said support, and means for transversing said electrodes, said magnet, and said support relatively to one another along said groove with the arcing terminals of said electrodes and said pole pieces of said magnet located opposite one another so that the magnetic field between said pole pieces passes through said arc loop and controls its alignment and spacing with said seam.

5. Welding apparatus comprising a nonmagnetic support having a groove in one side thereof, means for locating and clamping work parts to the other side of said support with their adjacent edges abutting one another to form a seam which is centered over said groove, a cooling plate located at one end of said support and having a groove in one side thereof forming an extension of said groove in said support, a plurality of electrodes positioned relatively to one another and said seam between said work parts so that the middle portion of an arc loop established between said electrodes is adjacent to and directed along said seam, means including a magnet having pole pieces of opposite polarity located in said groove in said support and said plate for generating a magnetic field which passes through said support and the edges of said sheets across said seam, means for yieldingly holding said pole pieces of said magnet in said groove in said support and said plate, and means for transversing said electrodes, said magnet, said plate, and said support relatively to one another along said groove in said support and said plate with the arcing terminals of said electrodes and the pole pieces of said magnet located opposite one another so that the magnetic field between said pole pieces passes through said arc loop and controls its alignment and spacing with said seam.

6. Welding apparatus comprising a nonmagnetic support with a groove on one side thereof opposed to and parallel with a groove on the other side thereof, means for locating work parts on one side of said support with their edges abutting one another to form a seam centered over the groove in said side of said support, means including said support and uniformly and closely spaced nonmagnetic jaws for clamping and conducting heat from the abutting seam edges of said work parts located on said support, a plurality of electrodes located adjacent said support and said jaws and positioned relatively to one another and said grooves in said support so that the middle portion of an arc loop established between the arcing terminals of said electrodes is directed along said grooves, means including a magnet having pole pieces of opposite polarity located in said other groove for generating a magnetic field which passes through said support and the abutting edges of said work parts across said seam, means for yieldingly holding said pole pieces of said magnet in said other groove, and means for transversing said support, said electrodes and said magnet relatively to one another with the arcing terminals of said electrodes and said pole pieces of said magnet positioned opposite one another so that said magnetic field passes from one of said pole pieces to the other through said arc loop and controls the alignment and spacing of its middle portion with said seam.

7. Welding apparatus comprising a table having a nonmagnetic section with a groove in one side thereof opposite to and parallel with a groove in the other side thereof, means for locating and clamping work parts on said one side of said table with their edges abutting one another to form a seam centered over said groove in said one side of said table, electrodes located on the same side of said table as said locating and clamping means and positioned relatively to one another and said seam so that the middle portion of an arc loop established between their arcing terminals is directed along said grooves, a carriage for supporting said electrodes, means on said carriage for moving said electrodes from a welding position in which the arcing terminals of said electrodes are closely adjacent said table to a non-welding position in which said arcing terminals are spaced a predetermined distance from said table, magnetic means having pole pieces located in said other groove in said other side of said table for generating a magnetic field which passes through said table and through the edges of said work parts across the seam between said work parts, a second carriage for supporting said magnetic means, means on said second carriage for biasing the pole pieces of said magnetic means into yielding engagement with said other groove in said table, guides for directing said carriages along paths of travel that are parallel to said grooves in said table, and means for moving said carriages in unison along said guides so that said magnetic field of said pole pieces of said magnetic means is directed through said arc loop and controls the alignment and spacing of its middle portion with the seam between said work parts.

8. Welding apparatus comprising a table having a nonmagnetic section with a groove in one side thereof opposed to and parallel with a groove in the other side thereof, means for locating work parts on said one side of said table with their edges abutting one another to form a seam centered over said groove in said one side of said table, means including the nonmagnetic section of said table and uniformly and closely spaced nonmagnetic jaws for clamping and conducting heat from the abutting seam edges of said work parts located on said table, a plurality of electrodes located adjacent said table and said jaws and positioned relatively to one another and said grooves in said table so that the middle portion of an arc loop established between the arcing terminals of said electrodes is directed along said grooves, a carriage for supporting said electrodes, means on said carriage for moving said electrodes from a welding position in which the arcing terminals of said electrodes are closely adjacent said table to a non-welding position in which said arcing terminals are spaced a predetermined distance from said table, a magnet having pole pieces of opposite polarity adapted to engage the surface of said other grooves in said other side of said table and direct the magnetic flux of said magnet through said table and the abutting edges of said work parts across the seam between said work parts, a second carriage for said magnet, a nonmagnetic support for locating said magnet in said second carriage, means on said second carriage for yieldingly biasing said support and said magnet towards said table to hold said pole pieces of said magnet in engagement with the surface of said other groove in said table, guides for directing said carriages along paths of travel that are parallel to said grooves in said table, and means for moving said carriages in unison along said guides so that the magnetic field through said pole pieces of said magnet interlinks said arc loop and controls the alignment and spacing of its middle portion with the seam between said work parts.

GARETH G. SOMERVILLE.